US011685839B2

United States Patent
Okada et al.

(10) Patent No.: US 11,685,839 B2
(45) Date of Patent: *Jun. 27, 2023

(54) NEAR-INFRARED CURABLE INK COMPOSITION AND PRODUCTION METHOD THEREOF, NEAR-INFRARED CURED LAYER, AND STEREOLITHOGRAPHY

(71) Applicant: SUMITOMO METAL MINING CO., LTD., Tokyo (JP)

(72) Inventors: Mika Okada, Isa (JP); Takeshi Chonan, Isa (JP); Hirofumi Tsunematsu, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 657 days.

This patent is subject to a terminal disclaimer.

(21) Appl. No.: 16/624,022

(22) PCT Filed: Jun. 19, 2018

(86) PCT No.: PCT/JP2018/023337
§ 371 (c)(1),
(2) Date: Feb. 26, 2020

(87) PCT Pub. No.: WO2018/235829
PCT Pub. Date: Dec. 27, 2018

(65) Prior Publication Data
US 2020/0224043 A1   Jul. 16, 2020

(30) Foreign Application Priority Data

Jun. 19, 2017   (WO) .................. PCT/JP2017/022459

(51) Int. Cl.
*C09D 11/101* (2014.01)
*B29C 64/124* (2017.01)
(Continued)

(52) U.S. Cl.
CPC .......... *C09D 11/101* (2013.01); *B29C 64/124* (2017.08); *B33Y 70/10* (2020.01);
(Continued)

(58) Field of Classification Search
CPC ... C09D 11/101; C09D 11/033; C09D 11/037; B29C 64/124; B33Y 10/00; B33Y 70/00
See application file for complete search history.

(56) References Cited

U.S. PATENT DOCUMENTS 10,752,512 B2   8/2020   Tsunematsu et al.
2008/0116426 A1   5/2008   Adachi
(Continued)

FOREIGN PATENT DOCUMENTS

EP   3 392 199 A1   10/2018
EP   3 395 924 A1   10/2018
(Continued)

OTHER PUBLICATIONS

Machine Translation of JP2015199668A, obtained May 26, 2022, Espacenet.com (Year: 2022).*
(Continued)

*Primary Examiner* — Michael M. Robinson
(74) *Attorney, Agent, or Firm* — Oliff PLC

(57) ABSTRACT

A near-infrared curable ink composition on a predetermined substrate that has excellent adhesion to the substrate when irradiated with near-infrared rays and cured, a near-infrared curable film obtained from the near-infrared curable ink composition, and stereolithography using the near-infrared curable ink composition, and contains composite tungsten oxide fine particles as near-infrared absorbing fine particles and uncured thermosetting resin, wherein the composite tungsten oxide fine particles have a XRD peak top intensity ratio value of 0.13 or more based on a XRD peak intensity
(Continued)

ratio value of 1 on plane (220) of a silicon powder standard sample (640c produced by NIST).

15 Claims, 2 Drawing Sheets

(51) Int. Cl.
  C09D 11/033    (2014.01)
  C09D 11/037    (2014.01)
  B33Y 70/10     (2020.01)
  B33Y 10/00     (2015.01)
(52) U.S. Cl.
  CPC ......... *C09D 11/033* (2013.01); *C09D 11/037* (2013.01); *B33Y 10/00* (2014.12)

(56) References Cited

U.S. PATENT DOCUMENTS

| | | |
|---|---|---|
| 2009/0280302 A1 | 11/2009 | Fukumoto et al. |
| 2011/0248225 A1 | 10/2011 | Mamak et al. |
| 2015/0038722 A1 | 2/2015 | Kato et al. |
| 2018/0371638 A1 | 12/2018 | Novet et al. |
| 2019/0002708 A1 | 1/2019 | Tsunematsu et al. |
| 2019/0032241 A1 | 1/2019 | Novet et al. |

FOREIGN PATENT DOCUMENTS

| | | |
|---|---|---|
| JP | H07-100433 A | 4/1995 |
| JP | 3354122 B2 | 12/2002 |
| JP | 2004-18716 A | 1/2004 |
| JP | 3494399 B2 | 2/2004 |
| JP | 2006-154516 A | 6/2006 |
| JP | 2008-127511 A | 6/2008 |
| JP | 2011-065000 A | 3/2011 |
| JP | 2011-198518 A | 10/2011 |
| JP | 5044733 B2 | 10/2012 |
| JP | 2012-532822 A | 12/2012 |
| JP | 5267854 B2 | 8/2013 |
| JP | 2013-173642 A | 9/2013 |
| JP | 5626648 B2 | 11/2014 |
| JP | 2015-117353 A | 6/2015 |
| JP | 2015-131928 A | 7/2015 |
| JP | 2015-199668 A | 11/2015 |
| JP | 2016-009634 A | 1/2016 |
| JP | 2016-009635 A | 1/2016 |
| TW | 201508053 A | 3/2015 |
| TW | 201714820 A | 5/2017 |
| WO | 2017/047736 A1 | 3/2017 |
| WO | 2017/073691 A1 | 5/2017 |
| WO | 2017/104853 A1 | 6/2017 |
| WO | 2017/104854 A1 | 6/2017 |
| WO | 2017/104855 A1 | 6/2017 |

OTHER PUBLICATIONS

Sep. 18, 2018 Search Report issued in International Patent Application No. PCT/JP2018/023337.
Feb. 18, 2021 Extended Search Report issued in European Patent Application No. 18821086.8.
Dec. 24, 2019 International Preliminary Report on Patentability issued in International Patent Application No. PCT/JP2018/023337.
Apr. 20, 2022 Office Action issued in Chinese Patent Application No. 201880038497.2.
"Building Materials," Aug. 31, 2013.
"New Propulsion: The Cutting Edge of Nanotechnology," Jan. 31, 2003.

* cited by examiner

NEAR-INFRARED CURABLE INK COMPOSITION AND PRODUCTION METHOD THEREOF, NEAR-INFRARED CURED LAYER, AND STEREOLITHOGRAPHY

TECHNICAL FIELD

The present invention relates to a near-infrared curable ink composition and a production method thereof, a near-infrared cured layer, and a stereo lithography.

DESCRIPTION OF RELATED ART

In recent years, UV-curable coating material that are cured using UV light can be printed without heating. Therefore, for example as described in Patent Documents 1 to 6, the UV-curable coating material is widely known as an environmentally friendly coating material.

However, when a composition that undergoes radical polymerization by UV irradiation is used as the UV-curable ink or the coating material, polymerization (curing) is inhibited in the presence of oxygen. On the other hand, when a composition that undergoes cationic polymerization by UV irradiation is used, there is a problem that a strong acid is generated during the polymerization.

Further, in order to improve a light resistance of a printed surface and a coated surface obtained, generally, an ultraviolet absorber is added to the printed surface or the coated surface. However, when the ultraviolet absorber is added to the UV-curable ink or coating material, there is a problem that curing by ultraviolet irradiation is inhibited.

In order to solve these problems, Patent Documents 7 and 8 propose near-infrared curable compositions that are cured by irradiation of near-infrared rays instead of ultraviolet rays.

Further, in Patent Document 9, an applicant discloses a near-infrared curable ink composition containing a composite tungsten oxide.

PRIOR ART DOCUMENT

Patent Document

[Patent Document 1] Japanese Patent Laid-Open Publication No. 7-100433
[Patent Document 2] Japanese Patent No. 3354122
[Patent Document 3] Japanese Patent No. 5267854
[Patent Document 4] Japanese Patent No. 56266648
[Patent Document 5] Japanese Patent No. 3494399
[Patent Document 6] Japanese Patent Laid-Open Publication No. 2004-18716
[Patent Document 7] Japanese Patent No. 5044733
[Patent Document 8] Japanese Patent Application Laid-Open Publication No. 2015-131828
[Patent Document 9] WO2017-047736 Gazette 131928

SUMMARY OF THE INVENTION

Problem to be Solved by the Invention

However, according to studies by the present inventors, the near infrared curable compositions described in Patent Documents 7 and 8 described above have a problem that near-infrared absorption properties are not sufficient.

Further, in recent years, market demand for the near-infrared curable composition is increasing. For example, even in a case of the near-infrared curable ink composition or the near-infrared cured layer containing composite tungsten oxide described in Patent Document 9, it is considered that it would be difficult to continue to satisfy market demands for improved adhesion to substrates.

The present invention has been made under the above circumstances, and a problem to be solved is to provide a near-infrared curable ink composition which is provided on a predetermined substrate and has excellent adhesion to a substrate when irradiated with near-infrared rays and cured, and a production method thereof, a near-infrared cured layer obtained from the near-infrared curable ink composition, and a stereolithography using the near-infrared curable ink composition.

Means for Solving the Problem

In order to solve the above-described problem, and as a result of intensive studies, the present inventors found a near-infrared curable ink composition containing composite tungsten oxide fine particles with a peak intensity ratio value being a predetermined value an X-ray diffraction (sometimes referred to as "XRD" hereafter in the present invention) pattern of the composite tungsten oxide fine particles. Thus, the present invention is completed. Specifically, the present inventors found that the near-infrared curable ink composition contains the composite tungsten oxide fine particles having a XRD peak top intensity ratio value of 0.13 or more based on a XRD peak intensity ratio value of 1 on plane (220) of a silicon powder standard sample (640c produced by NIST), and such a near-infrared curable ink composition is provided on a predetermined substrate and has excellent adhesion to the substrate when cured by irradiation of the near-infrared rays. Thus, the present invention is completed.

Namely, in order o solve the above-described problem, a first invention is a near-infrared curable ink composition containing composite tungsten oxide fine particles as near-infrared absorbing fine particles and uncured thermosetting resin,
wherein the composite tungsten oxide fine particles have a XRD peak top intensity ratio value of 0.13 or more based on a XRD peak intensity ratio value of 1 on plane (220) of a silicon powder standard sample (640c produced by NIST).

A second invention is the near-infrared curable ink composition of the first invention, wherein the composite tungsten oxide fine particles are expressed by general formula. $M_xW_yO_z$ (wherein M element is an element of one or more kinds selected from H, He, alkali metal, alkaline earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$).

A third ion is the near-infrared curable ink composition of the first or second invention, wherein some of the composite tungsten oxide fine particles have a hexagonal crystal structure or all have a hexagonal crystal structure.

A fourth invention is the near-infrared curable ink composition of any one of the first to third inventions, wherein a crystallite size of each composite tungsten oxide fine particle is 1 nm or more.

A fifth invention is the infrared curable ink composition according to a one of the second fourth inventions, wherein the M element of the composite tungsten oxide fine particles is composed of a composite tungsten oxide that is one or more selected from Cs, Rb, K, Tl, In, Ba, Li, Ca, Sr, Fe, and Sn.

A sixth invention is the near-infrared curable ink composition of any one of the first to fifth inventions, wherein a surface of the near-infrared absorbing fine particles is coated with an oxide containing one or ore elements of Si, Ti, Zr, and Al.

A seventh invention is the near-infrared curable ink composition of any one of the first to sixth invention, further containing one or more selected from organic pigments, inorganic pigments and dyes.

An eighth invention is the near-infrared curable ink composition of any one of the first to seventh inventions, further containing a dispersant.

A ninth invention is the near-infrared curable ink composition of any one of the first to eighth inventions, further containing a solvent.

A tenth invention is the near-infrared curable ink composition of any one of the first to ninth inventions, wherein a dispersed particle size of the near-infrared absorbing fine particles is 1 nm or more and 200 nm or less.

An eleventh invention is a near-infrared cured layer, wherein the near-infrared curable ink composition according to any one of the first to tenth inventions is cured by being irradiated with near-infrared rays.

A twelfth invention is a stereolithography, including:

applying a near-infrared curable ink composition of any one of the first to tenth inventions on a desired substrate to obtain a coated material; and irradiating the coated material with near-infrared rays, to cure the near-infrared curable ink composition.

A thirteenth invention is a method for producing a near-infrared curable ink composition containing composite tungsten oxide fine particles and an uncured thermosetting resin, the method including:

producing by firing the composite tungsten oxide particles so as to have a XRD peak top intensity ratio value of 0.13 or more based on a XRD peak intensity ratio value of 1 on plane (220) of a silicon powder standard sample (640c produced by NIST); and adding the produced composite tungsten oxide particles into the uncured thermosetting resin, while maintaining the XRD peak top intensity ratio value at 0.13 or more.

Advantage of the Invention

The near-infrared curable ink composition according to the present invention has excellent adhesion to a substrate and is industrially useful.

DETAILED DESCRIPTION OF THE INVENTION

Figure 1:
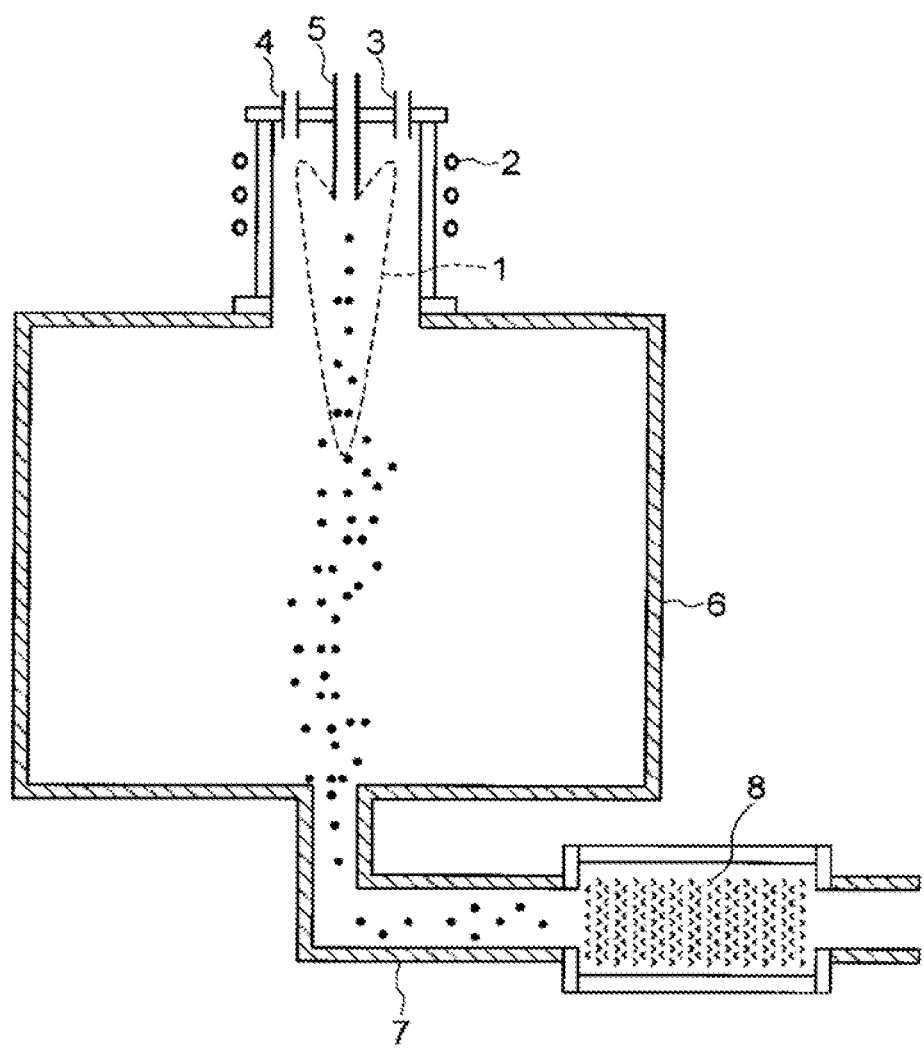
FIG. 1 is a conceptual diagram of a high-frequency plasma reactor used in the present invention.

Hereinafter, [1] Near-infrared curable ink composition and [2] Stereolithography according to the present invention will be described in detail.

[1] Near-Infrared Curable Ink Composition

The near-infrared curable ink composition according to the present invention contains composite tungsten oxide fine particles as near-infrared absorbing fine particles, an uncured thermosetting resin, and optionally other components. Therefore, (1) Composite tungsten oxide fine particles as near-infrared absorbing fine particles, (2) Production method of composite tungsten oxide fine particles, (3) Uncured thermosetting resin, (4) Other components, (5) Near-infrared curable ink composition, will be described in this order.

(1) Composite Tungsten Oxide Fine Particles as Near-Infrared Absorbing Fine Particles As the near-infrared absorbing fine particles used in the near-infrared curable ink, carbon black powder and tin-added indium oxide (which may be described as "ITO" in the present invention) powder are conceivable in addition to the composite tungsten oxide fine particles. However, when the carbon black powder is used as the near-infrared absorbing fine particles, the degree of freedom in selecting the color of the near-infrared curable ink composition is reduced, because the powder is black. On the other hand, when ITO powder is used, curability of the near-infrared curable ink composition cannot be exhibited unless a large amount of the powder is added. Therefore, if a large amount of the powder is added, there is a problem that a color tone of the near-infrared curable ink composition is affected due to the ITO powder added in a large amount.

In the infrared cured layer containing the near-infrared absorbing fine particles, coloring caused by the near-infrared absorbing fine particles is not desired. Therefore, the present invention provides the near-infrared absorbing fine particles containing the composite tungsten oxide fine particles that don't allow the coloring to occur, which is caused by the near infrared absorbing fine particles. Therefore, by selecting the composite tungsten oxide as the near-infrared absorbing fine particles, free electrons are generated in the composite tungsten oxide, and absorption property derived from the free electrons appear in a near-infrared region. This is effective as the near-infrared absorbing fine particles having a wavelength of around 1000 nm.

The dispersed particle size of the near-infrared absorbing fine particles according to the present invention is preferably 800 nm or less. This is because near-infrared absorption of the composite tungsten oxide, which is the near-infrared absorbing fine particles, is based on light absorption and scattering unique to nanoparticles called "localized surface plasmon resonance", that is, when the dispersed particle size of the composite tungsten oxide fine particles is 800 nm or less, the localized surface plasmon resonance occurs, and the near-infrared absorbing fine particles efficiently absorb near-infrared rays irradiated to the near-infrared curable ink composition according to the present invention, and the near-infrared rays are easily converted to thermal energy.

When a dispersed particle size is 200 nm or less, the localized surface plasmon resonance becomes stronger, and the near-infrared rays irradiated to the near-infrared curable ink composition according to the present invention are more efficiently absorbed, which is more preferable.

Further, the dispersed particle size of the near-infrared absorbing fine particles according to the present invention is more preferably 200 nm or less from a viewpoint of maintaining transparency. This is because when the dispersed particle size is smaller than 200 nm, light scattering due to Mie scattering and Rayleigh scattering of the fine particles is sufficiently suppressed, and transparency in a visible light wavelength region can be maintained.

Since the near-infrared absorbing fine particles can maintain transparency in the visible light wavelength region, the degree of freedom of color tone adjustment can be ensured without harming the color of a pigment when a coloring material such as a pigment is added to the near-infrared curable ink composition of the present invention. On the other hand, even when the coloring material is not added to the near-infrared curable ink composition of the present invention, it is possible to ensure the transparency of an optically shaped object, which is a cured product described later.

Further, a near-infrared curable ink composition coated product of the present invention shows light blue color due to the composite tungsten oxide fine particles of the near-infrared absorbing fine particles according to the present invention. However, when the dispersed particle size of the composite tungsten oxide fine particles is 200 nm or less, the light blue coloration can be canceled by the coloring material such as a pigment. From a viewpoint of canceling the light blue coloration, the dispersed particle size is preferably 150 nm or less, more preferably 100 nm or less.

On the other hand, from a viewpoint of the infrared absorption property, the dispersed particle size of the composite tungsten oxide fine particles is preferably 1 nm or more.

Here, the dispersed particle size means an aggregated particle size of the near-infrared absorbing fine particles containing the composite tungsten oxide in a solvent, and can be measured using various commercially available particle size distribution analyzers. For example, sampling is performed from a dispersion liquid in which the near-infrared absorbing fine particles containing the composite tungsten oxide are dispersed in the solvent, and the particle size can be measured by a particle size measuring device (ELS-8000 made by Otsuka Electronics Co., Ltd.) based on a dynamic light scattering method as a principle.

Further, the above-described composite tungsten oxide is effective as a near-infrared absorbing material when it has a tungsten bronze structure such as tetragonal, cubic, or hexagonal crystal structure. Depending on the crystal structure taken by the composite tungsten oxide, an absorption position in the near-infrared region tends to change as follows: it tends to move to a longer wavelength side when the crystal structure is tetragonal rather than cubic, and it tends to move to the longer wavelength side when the crystal structure is hexagonal rather than tetragonal. Further, absorption in the visible light region is the smallest in the hexagonal crystal structure, followed by tetragonal crystal structure, and it is largest in the cubic crystal structure among them. Therefore, it is preferable to use hexagonal tungsten bronze applications that transmit more visible light and shield more infrared light. However, the trend of the optical properties described here is only a rough trend, and varies depending on the type of an additive element, an amount of addition, and an amount of oxygen, and the present invention is not limited thereto.

The present inventors found that in the XRD pattern of the hexagonal composite tungsten oxide composite, the composite tungsten oxide fine particles whose peak top intensity ratio value is a predetermined value, particularly efficiently absorb the near-infrared rays that are irradiated and converts the near-infrared rays thermal energy. Specifically, the composite tungsten oxide fine particles have the XRD peak top intensity ratio value of 0.13 or more based on the XRD peak intensity ratio value of 1 on (220) plane of a silicon powder standard sample (made by NIST, 640c), which is the sample prepared under the same measurement conditions as the composite tungsten oxide fine particles to be measured.

According to the finding by the present inventors, the XRD peak top intensity of the composite tungsten oxide fine particles described above is closely related to the crystallinity of the fine particles, and a as a result, it is closely related to a free electron density of the fine particles, and greatly affects the near-infrared absorption property of the fine particles. Then, when the XRD peak top intensity of the composite tungsten oxide fine particles is 0.13 or more, desired near-infrared absorption property can be obtained. When the transmittance of light having a wavelength of 550 nm in the visible light region is adjusted to about 70%, the desired near-infrared absorption property is as follows: the transmittance of light having a wavelength of 1000 nm in the near-infrared region is set to about $1/7$ or less of the transmittance of light in the visible light region. The transmittance at a wavelength of 1000 nm is caused by the absorption of near-infrared rays by the composite tungsten oxide fine particles. Then, when the composite tungsten oxide fine particles absorb the near-infrared rays, the near-infrared rays are converted to heat. When the near-infrared absorption property is exhibited, a contrast between visible lights and the near-infrared rays becomes clear.

When the XRD peak top intensity ratio value of the composite tungsten oxide fine particle is 0.13 or more, the free electron density is secured in the fine particle, and the above-described near-infrared absorption properties are exhibited. On the other hand, it is preferable that the peak top intensity ratio is 0.7 or less.

Note that the XRD peak top intensity is the peak intensity at $2\theta$ where the peak count, is highest in the X-ray diffraction pattern. Then, hexagonal Cs composite tungsten oxide and Rb composite tungsten oxide, the peak count $2\theta$ in the X-ray diffraction pattern appears in a range of 23° to 31°.

The XRD peak top intensity of the composite tungsten oxide fine particles will also be explained from a different viewpoint.

The fact that the XRD peak top intensity ratio value of the composite tungsten oxide fine particle is 0.13 or more, shows that the composite tungsten oxide fine particles with good crystallinity containing almost no hetero phases have been obtained. Namely, it is considered that the obtained composite tungsten oxide fine particles are not amorphized. As a result, it is considered that by dispersing the composite tungsten oxide fine particles containing almost no hetero phases in a liquid medium transmitting visible light, near infrared shielding properties can be sufficiently obtained.

Note that in the present invention, the "hetero phase" means a phase of a compound other than the composite tungsten oxide.

For measuring the XRD peak top intensity of the above-described composite tungsten oxide fine particles, a powder X-ray diffraction method is used. At this time, in order to have objective quantification in comparison between samples, it is necessary that standard samples are measured under the same conditions, and a comparison between samples is performed using the XRD peak top intensity ratio of the fine particles with respect to the peak intensity of the standard sample. It is desirable to use a universal silicon powder standard sample (NIST, 640c) as a standard sample. In order to have more quantification, it is desirable that the other measurement conditions are always constant, and a sample holder having a depth of 1.0 mm is filled with an fine particle sample by a known operation during X-ray diffraction measurement. Specifically, a sample holder with a depth of 1.0 mm is filled with the fine particle sample by a known operation in X-ray diffraction measurement. Specifically, in order to avoid a preferential orientation (crystal orientation) in the fine particle sample, it is preferable to fill the sample holder randomly and gradually, and fill the sample holder as densely as possible without unevenness.

As an X-ray source, an X-ray tube having Cu as an anode target material is used in an output setting of 45 kV/40 mA, and measurement is performed by powder X-ray diffraction method of θ-2θ in a step scan mode (step size: 0.0165° (2θ) and counting time: 0.022 msec/step).

At this time, the XRD peak intensity is varied according to the use time of the X-ray tube, and therefore it is preferable that the use time of the X-ray tube is almost the same among samples. In order to ensure objective quantification, it is necessary that a difference between the samples during the use time of the X-ray tube be at most ½₀ or less of a predicted lifetime of the X-ray tube. As a more preferable measurement method, there is a method for calculating the XRD peak intensity ratio by performing measurement of the silicon powder standard sample every time the X-ray diffraction pattern of the composite tungsten oxide fine particles is measured. Such a measurement method is used in the present invention. The X-ray tube predicted lifetime of a commercially available X-ray device is mostly several thousand hours or more and the measurement time per sample is several hours or less, and therefore by performing the above-described preferable measurement method, an influence on the XRD peak top intensity ratio due to the use time of the X-ray tube can be made negligibly small. Further, in order to keep the temperature of the X-ray tube constant, a cooling water temperature for the X-ray tube is preferably kept constant.

Note that the XRD pattern of the composite tungsten oxide fine particles contained in the anti-counterfeit ink composition after being disintegrated, pulverized or dispersed described later, is also maintained in the XRD pattern of the composite tungsten oxide fine particles contained in the anti-counterfeit ink and the anti-counterfeit printed matter in which the anti-counterfeit ink composition of the present invention is used. Note that the crystal structure and the crystallite size can be obtained by analyzing the XRD pattern obtained when measuring the XRD peak top intensity.

The above-described composite tungsten oxide is preferably expressed by a general formula $M_xW_yO_z$ (M is an element of one or more selected from H, He, alkali metal, alkaline earth metal, rare earth element, Mg, Zr, Cr, Mn, Fe, Ru, Co, Rh, Ir, Ni, Pd, Pt, Cu, Ag, Au, Zn Cd, Al, Ga, In, Tl, Si, Ge, Sn, Pb, Sb, B, F, P, S, Se, Te, Ti, Nb, V, Mo, Ta, Re, Be, Hf, Os, Bi, and I, W is tungsten, O is oxygen, satisfying $0.001 \leq x/y \leq 1$, $2.2 \leq z/y \leq 3.0$).

For the composite tungsten oxide, a more efficient near-infrared absorbing material can be obtained by performing control of the amount of oxygen and the addition of an element that generates free electrons in combination. A general formula of the near-infrared absorbing material in which control of the amount of oxygen and the addition of an element that generates free electrons are performed in combination, is expressed as $M_xW_yO_z$ (where M element is the M element, W is tungsten, and O is oxygen), wherein a relationship of $0.001 \leq x/y \leq 1$, $2.2 \leq z/y \leq 3.0$ is satisfied.

First, the value of x/y indicating an addition amount of the M element will be described. When the value of x/y is 0.001 or more, a sufficient amount of free electrons is generated and a desired near-infrared absorption property can be obtained. Then, as the addition amount of the M element, is increased, a feed amount of the free electrons is increased and the near-infrared absorption property is also increased, but when the value of x/y is about 1, the effect is saturated. Further, when the value of x/y is 1 or less, generation of an impurity phase in the composite tungsten fine particles can be avoided, which is preferable.

Further, element NI is preferably one or more selected from H, He, alkali metal, alkaline earth metal, rare earth element, Mg, Zr, Cr, Mn, Fe, Ru, Co, Rh, Ir, Ni, Pd, Pt, Cu, Ag, Au, Zn Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I. Here, from a viewpoint of stability in the $M_xW_yO_z$, to which the element M is added, the element M is more preferably alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, and Re.

Next the value of z/y indicating a control of an oxygen amount will be described. The value of z/y is preferably $2.2 \leq z/y \leq 3.0$, because there is a supply of the free electrons due to the addition amount of the M element described above.

In order to improve the transmission in the visible light region and improve the absorption in the near-infrared region according to the present invention, unit structure (a structure in which six octahedrons formed of $WO_6$ units are assembled to form a hexagonal void, and element M is arranged in the void) may be included in the composite tungsten oxide, and the composite tungsten oxide fine particles may be crystalline or amorphous.

When the cation of the NI element is added to the hexagonal void, the absorption in the near-infrared region is improved. Here, generally, when the M element having a large ion radius is added, the hexagonal crystal is formed. Specifically, when one or more selected from Cs, Rb, K, Tl, In, Ba, Li, Ca, Sr, Fe, and Sn are added, the hexagonal crystal is easily formed, which is preferable. Of course, elements other than these are not limited to the above elements as long as the additive element M exists in the hexagonal voids formed in units of $WO_6$.

Particularly, when the composite tungsten oxide having the hexagonal crystal structure has a uniform crystal structure, the addition amount of the additive element M is preferably 0.2 or more and 0.5 or less, and more preferably 0.30 to 0.35 in terms of the value of x/y. Particularly, when the value of x/y is 0.33, it is considered that the additive element M is arranged in all the hexagonal voids.

Further, in the composite tungsten oxide fine particles as the near-infrared absorbing material fine particles, a single crystal whose amorphous phase volume ratio is 50% or less is preferable.

This is because when the composite tungsten oxide fine particles are single crystals having the amorphous phase volume ratio of 50% or less, the crystallite size can be 200 nm or less while maintaining the XRD peak top intensity value. By setting the crystallite size of the composite tungsten oxide fine particles to 200 nm or less, the dispersed particle size can be set to a preferable range of 1 nm or more and 200 nm or less.

In contrast, the following cases can be considered: although the composite tungsten oxide fine particles have a particle size of 1 nm or more and 200 nm or less, further preferably 10 nm or more and 200 nm or less, the amorphous phase is sometimes present in a volume ratio exceeding 50%, or the XRD peak top intensity ratio of the composite tungsten oxide fine particles is less than 0.13 when the fine particles are polycrystalline, and as a result, near-infrared absorption properties are insufficient, and the near-infrared curable ink composition is sometimes insufficiently cured.

On the other hand, from a viewpoint of a near-infrared absorption property of the composite tungsten oxide fine particles, the crystallite size is preferably 10 or more. Then, the crystallite size of the composite tungsten oxide fine particles is more preferably 200 nm or less and 10 nm or more. This is because when the crystallite size is in the range of 200 nm or less and 10 nm or more, the XRD peak top intensity ratio value exceeds 0.13, and the near-infrared curable ink composition is cured due to further excellent near-infrared absorption property.

Note that the X-ray diffraction pattern of the composite tungsten oxide fine particles in the composite tungsten oxide fine particle dispersion liquid after disintegration treatment, pulverization treatment, or dispersion treatment described later are maintained even in the X-ray diffraction pattern of the composite tungsten oxide fine particles obtained by removing volatile components from the composite tungsten oxide fine particle dispersion liquid, or even in the X-ray diffraction pattern of the composite tungsten oxide fine particles contained in a dispersion body obtained from the dispersion liquid.

As a result, the effect of the present invention is most effectively exhibited when parameters indicating a crystalline state such as the XRD pattern, the XRD peak top intensity, and the crystallite size of the composite tungsten oxide fine particles in the composite tungsten oxide fine particle dispersion liquid and the composite tungsten fine particle dispersion body obtained from the dispersion liquid, are the states of the composite tungsten oxide fine particles that can be used in the present invention.

The fact that the composite tungsten oxide fine particles are single crystals can be confirmed from an electron microscope image by transmission electron microscope in which no grain boundaries are observed inside each fine particle, and only uniform lattice fringes are observed. Further, the fact that the amorphous phase volume ratio is 50% or less in the composite tungsten oxide fine particles can be confirmed from the same electron microscope image by transmission electron microscope in which uniform lattice fringes are observed throughout the fine particles, and there are almost no unclear spots. Since the amorphous phase exists on the outer periphery of the fine particles in many cases, the volume ratio of the amorphous phase can be calculated by paying attention to the outer periphery of the fine particles in many cases. For example, in a spherical composite tungsten oxide fine particle, when the amorphous phase with unclear lattice fringes exists in a layered manner on the outer periphery of the fine particles, the amorphous phase volume ratio in the composite tungsten oxide fine particles is 50% or less, as long as the thickness of the layer is 10% or less of the particle size.

On the other hand, when the composite tungsten oxide fine particles are dispersed inside a coating layer constituting the composite tungsten oxide fine particle dispersion body, and a layer obtained by applying a predetermined operation to the coating layer to cure the resin of the coating layer (referred to as a "cured layer" in the present invention) as described later, the composite tungsten oxide fine particles can be said to be a single crystal having the amorphous phase volume ratio of 50% or less and can be said to be substantially a single crystal, as long as the value obtained by subtracting the crystallite size from the average particle size of the dispersed composite tungsten o de fine particles is 20% or less.

Here, the average particle size of the composite tungsten oxide fine particles can be obtained from a transmission electron microscope image the composite tungsten oxide fine particle dispersion body, by using an image processing device to measure the particle size of 100 composite tungsten oxide fine particles and calculate the average value thereof. Then, synthesis, pulverization, and dispersion may be suitably performed depending on production equipment, so that the difference between the average particle size and the crystallite size of the composite tungsten oxide fine particles dispersed in the composite tungsten oxide fine particle dispersion body is 20% or less.

BET specific surface area of the composite tungsten oxide fine particles are closely related to the particle size distribution of the fine particles, and at the same time, greatly affect the near-infrared absorption property of the fine particles themselves and the light resistance to suppress light-coloring. When the BET specific surface area of the fine particles is 30.0 $m^2/g$ or more and 120.0 $m^2/g$ or less, desirable light resistance can be obtained, and it is preferably 30.0 $m^2/g$ or more and 90.0 $m^2/g$ or less, more preferably 35.0 $m^2/g$ or more and 70.0 $m^2/g$ or less.

The small BET specific surface area of the composite tungsten oxide fine particles indicates that the crystallite size of the fine particles is large. Accordingly, when the BET specific surface area of the fine particles is less than 30.0 $m^2/g$, the fine particles preferably pulverized for a long time with a medium stirring mill or the like to obtain finer particles, in order to produce a transparent near-infrared curable ink composition in the visible light region. However, attention should be paid so that a large number of fine particles having a crystallite size of less than 1 nm that do not exhibit near-infrared absorption property are not generated with the pulverization. The reason is considered as follows: when preparing the near-infrared curable ink composition containing a large number of fine particles having a crystallite size of less than 1 nm, the near-infrared curable ink composition may become dark and colored (light-colored) due to strong light irradiation to the near-infrared curable ink composition, the strong light including ultraviolet light.

On the other hand, even when the BET specific surface area of the particles exceeds 200 $m^2/g$, the same tendency is shown in photo-coloring. Accordingly, when the BET specific surface area is 200 $m^2/g$ or less, this indicates that the BET particle size is 2 nm or more, which means that there are almost no fine particles having a crystallite size of less than 1 nm that do not contribute to the near infrared absorption property. Therefore, when the BET specific surface area of the fine particles is 200 $m^2/g$ or less, the near-infrared curable ink composition having good light resistance can be produced.

The values of the crystallite size and the BET specific surface area of the composite tungsten oxide fine particles are preferably within the above-described range, before and after pulverization and dispersion when obtaining the composite tungsten oxide fine particle dispersion liquid.

Further, the composite tungsten oxide fine particles may contain a component that volatilizes by heating (which may be described as "volatile component" in the present invention). The volatile component is derived from a substance adsorbed when the composite tungsten oxide particles are exposed to storage atmosphere or air, or during the synthesis treatment. Here, specific examples of the volatile component include water and a dispersion solvent described later, and for example, it is a component that volatilizes from the composite tungsten oxide fine particles by heating at 150° C. or less.

The volatile, component and their contents in the composite tungsten oxide particles are, as described above, are closely related to a water content adsorbed when the fine particles are exposed to the atmosphere, and a residual amount of the solvent during drying of the fine particles. Then, the volatile component and the content thereof may greatly affect the dispersibility when the fine particles are dispersed in the near-infrared curable ink composition or the like.

In contrast, in the composite tungsten oxide fine particles having a volatile component content of a predetermined amount or less, the effect of compatibility between the solvent used in the near-infrared curable ink composition and the volatile component adsorbed on the fine particles is slight. Therefore, wide versatility is demonstrated.

According to the intensive steady by the present inventors, it is found that when the content of the volatile component is 2.5 mass % or less in the composite tungsten oxide fine particles, the fine particles can be dispersed in a dispersion medium used for almost all of the dispersion systems, and such composite tungsten oxide fine particles become the composite tungsten oxide fine particles having versatility.

On the other hand, it is also found that a lower limit of a content ratio of the volatile component is not particularly limited.

As a result, when the fine particles having the volatile component content of 2.5 mass % or less are not excessively secondary aggregated, the fine particles can be dispersed in resin or the like, using a method of uniformly mixing and kneading (including melt mixing) by a mixing machine such as a tumbler, a Nauta mixer, a Henschel mixer, a super mixer, planetary mixer, and a kneading machine such as a Banbury mixer, a kneader, a roll, a single screw extruder, and a twin screw extruder.

The content of the volatile component in the composite tungsten oxide fine particles can be measured by thermal analysis. Specifically, a weight reduction of a composite tungsten oxide fine particle sample may be measured by holding the composite tungsten oxide fine particle sample at a temperature lower than a temperature at which the composite tungsten oxide fine particle is thermally decomposed and higher than a temperature at which the volatile component is volatilized. Further, when the volatile component is specified, gas mass spectrometry may be used together to analyze the volatile component.

when the surfaces of the composite tungsten oxide particles (A1) and the hexaboride particles (A2) are coated with oxide containing one kind or more elements of Si, Ti, Zr, Al, weather resistance can be preferably further improved.

(2) Method for Producing the Composite Tungsten Oxide Fine Particles

The method for synthesizing the composite tungsten oxide fine particles, includes the thermal plasma method for charging a tungsten compound starting material into a thermal plasma, and the solid-phase reaction method for performing heat treatment to the tungsten compound starting material in a reducing gas atmosphere. The composite tungsten oxide fine particles synthesized by the thermal plasma method or the solid-phase reaction method are subjected to dispersion treatment or pulverization and dispersion treatment.

Explanation will be given hereafter in the order of (1) Thermal plasma method, (2) Solid-phase reaction method, and (3) Synthesized composite tungsten oxide fine particles.

(1) Thermal Plasma Method

Explanation will be given for the thermal plasma method in the order of (i) Raw material used for the thermal plasma method, (ii) Thermal plasm method and its conditions.

(i) Raw Material Used for the Thermal Plasma Method

When synthesizing the composite tungsten oxide fine particles by the thermal plasma method, a mixed powder of the tungsten compound and the M element compound can be used as a raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, as the M element compound, it is preferable to use at least one element selected from oxides, hydroxides, nitrates, sulfates, chlorides and carbonates of M element.

The above-described tungsten compound and the above-described aqueous solution containing M element compound, are wet-mixed so that the ratio of the M element to the W element is $M_xW_yO_z$ (wherein M is the M element, W is tungsten, O is oxygen, satisfying $0.001 \leq x/y \leq 1.0$, $2.0 \leq z/y \leq 3.0$). Then, by drying the obtained mixture liquid, a mixed powder of the M element compound and the tungsten compound is obtained. Then, the mixed powder can be used as a raw material for the thermal plasma method.

Further, the composite tungsten oxide obtained by first firing of the mixed powder in an inert gas alone or in a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plan a is used, it is preferable to use thermal plasma having a high temperature part of 10000 to 15000 K, and particularly to use plasma capable of controlling the time for generating the fine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide fine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rats of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic field (frequency 4 MHz). At this time, high-frequency power is set to 30 to 40 kW.

Further, the mixed powder of the M element compound and the tungsten compound obtained by the above-described synthesis method, or a raw material of the composite tungsten oxide is introduced from the raw material powder feeding nozzle 5 into the thermal plasma at a feed rate of 25 to 50 g/min, using the argon gas of 6 to 98 L/min fed from a gas feeding device 11 as a carrier gas, and a reaction is caused fora predetermined time. After the reaction, the generated composite tungsten oxide fine particles are deposited on a filter 8, and therefore the deposited particles are recovered.

The carrier gas flow rate and the raw material feed rate greatly affect the generation time of the fine particles. Therefore, it is preferable that the carrier gas flow rate is set to 6 L/min or more and 9 L/min or less and the raw material feed rate is set to 25 to 50 g/min.

Further, the plasma gas flow rate is preferably 30 L/min or more and 45 L/min or less, and a sheath gas flow rate is preferably 60 L/min or more and 70 L/min or less. The plasma gas has a function of keeping a thermal plasma region having a high temperature part of 10000 to 15000 K, and the sheath gas has a function of cooling an inner wall surface of a quartz torch in the reaction vessel and preventing melting of the quart torch. At the same time, the plasma gas and the sheath gas affect the shape of the plasma region, and therefore these gas flow rates are important parameters for shape control of the plasma region. As the plasmas flow rate and the sheath gas flow rate are increased, the shape of the plasma region extends in a gas flow direction, and a temperature gradient of the plasma tail flame part becomes gentle, and therefore it becomes possible to lengthen the generation time of the fine particles to be produced and to produce the fine particles with high crystallinity. On the contrary, as the plasma gas flow rate and the sheath gas flow rate are decreased, the shape of the plasma region shrinks in the gas flow direction, and the temperature gradient of the plasma tail flame part becomes steep, and therefore it becomes possible to shorten the generation time of the fine particles to be produced and to form the fine particles having a large BET specific surface area. As a result, the XRD peak top intensity ratio value of the composite tungsten oxide fine particles can be set to a predetermined value.

When the composite tungsten oxide obtained by synthesis using the thermal plasma method has a crystallite size exceeding 200 nm, or when the dispersed particle size of the composite tungsten oxide in the anti-counterfeit ink composition obtained from the composite tungsten oxide obtained by the thermal plasma method exceeds 200 nm, the pulverization and dispersion treatment described later can be performed. When the composite tungsten oxide is synthesized by the thermal plasma method, the effect of the present invention is exhibited by appropriately selecting the conditions for the pulverization and dispersion treatment thereafter and setting the XRD peak top intensity ratio value to 0.13 or more, thereby suppressing the difference between the average particle size and the crystallite size of the composite tungsten oxide fine particles to 20% or less in the anti-counterfeit printed matter.

(2) Solid-Phase Reaction Method

The solid-phase reaction method will be described in an order of (i) Raw material used in the solid-phase reaction method, and (ii) Firing in the solid-phase reaction method and its conditions.

(i) Raw Material Used in the Solid-Phase Reaction Method

When synthesizing the composite tungsten oxide fine particles by the solid-phase reaction method, a tungsten compound and an M element compound are used as the raw material.

The tungsten compound is preferably one or more kinds selected from tungstic acid ($H_2WO_4$), ammonium tungstate, tungsten hexachloride, and tungsten hydrate obtained by adding water to the tungsten hexachloride which is dissolved in alcohol and hydrolyzed, and then evaporating the solvent.

Further, the element NI compound used for producing the raw material of the composite tungsten oxide fine particles expressed by the general formula $M_xW_yO_z$ (wherein M is an element of one or more kinds selected from Cs, Rb, K, Tl, Ba, satisfying $0.001 \leq x/y \leq 1$, $2.2 \leq z/y \leq 3.0$) which is a more preferable embodiment, is preferably one or more kinds selected from oxides, hydroxides, nitrates, sulfates, chlorides, carbonates of element M.

Further, a compound containing an impurity element of one or more kinds selected from Si, Al, and Zr (sometimes referred to as "impurity element compound" in the present invention) may be contained in the composite tungsten oxide fine particles as a raw material. The impurity element compound does not react with the composite tungsten compound in a subsequent firing step, and works to suppress a crystal growth of the composite tungsten oxide and prevent coarsening of the crystal. The compound containing the impurity element is preferably one or more kinds selected from oxides, hydroxides, nitrates, sulfates, chlorides, carbonates, and colloidal silica and colloidal alumina having a particle size of 500 nm or less are particularly preferable.

The above-described tungsten compound, the aqueous solution containing the M element compound, and the above-described impurity element compound are wet-mixed in such a manner that the ratio of the M element to the W element is $M_xW_yO_z$ (M is the M element, W is tungsten, O is oxygen, satisfying $0.001 \leq x/y \leq 1.0$, $2.0 \leq z/y \leq 3.0$). When the impurity element compound is contained as a raw material, the impurity element compound is wet-mixed so as to be 0.5 mass % or less. Then, by drying the obtained mixed solution, the mixed powder of the M element compound and the tungsten compound, or the mixed powder of the M element compound containing the impurity element compound and the tungsten compound can be obtained.

(ii) Firing in the Solid-Phase Reaction Method and its Conditions

One-stage firing is performed to the mixed powder of the M element compound and the tungsten compound produced by the wet-mixing, or the mixed powder of the M element compound containing the impurity element compound and the tungsten compound, in the inert gas alone or mixed gas atmosphere of the inert gas and reducing gas. At this time, a firing temperature is preferably close to a temperature at which the composite tungsten oxide fine particles start to crystallize.

Specifically, the firing temperature is preferably 1000° C. or less, more preferably 800° C. or less, still more preferably 800° C. or less and 500° C. or more. By controlling the firing temperature, the XRD peak top intensity ratio value of the composite tungsten oxide fine particles of the present invention can be set to a predetermined value. By controlling the firing temperature, the XRD peak top intensity ratio of the composite tungsten oxide fine particles of the present invention can be set to a predetermined value.

In synthesizing the composite tungsten oxide, tungsten trioxide may be used instead of the tungsten compound.

(3) Synthesized Composite Tungsten Oxide Fine Particles

When the anti-counterfeit ink composition and the anti-counterfeit ink (which may be described as "ink composition or the like" in the present invention) described later are prepared by using the composite tungsten oxide fine particles obtained by the synthesis method using the thermal plasma method or the solid phase reaction method, the crystallite size of the fine particles contained in the ink composition or the like exceeds 200 nm in some cases. In such a case, the pulverization and dispersion treatment may be performed to the composite tungsten oxide fine particles in the step of producing the ink composition or the like described later. Then, if the XRD peak top intensity ratio value of the composite tungsten oxide fine particles obtained through the pulverization and dispersion treatment is within a range of the present invention, the ink composition or the like of the present invention obtained from the composite tungsten oxide fine particles and the dispersion liquid thereof exhibit excellent near infrared shielding properties.

The XRD peak top intensity value and the BET specific surface area of the composite tungsten oxide fine particles can be controlled by various production conditions, and for example can be controlled by a change of the production conditions such as a temperature (firing temperature), a generation time (firing time), a generation atmosphere (firing atmosphere), a form of a precursor raw material, an annealing treatment after generation, doping of an impurity element, and the like, for producing the fine particles by the thermal plasma method or the solid-phase reaction method.

In the composite tungsten oxide fine particles produced here, production conditions for the composite tungsten oxide particles are set so that the XRD peak top intensity ratio value is 0.13 or more based on the XRD peak intensity ratio value of 1 on plane (220) of a silicon powder standard sample (640c produced by NIST).

On the other hand, the content of the volatile component of the composite tungsten oxide fine particles can be controlled by a suitable setting of the production conditions such as a preservation method and a storage atmosphere of the fine particles, a temperature at which the fine particles dispersion liquid is dried, a drying time, and a drying method, and the like. Note that the content of the volatile component of the composite tungsten oxide fine particles does not depend on the crystal structure of the composite tungsten oxide fine particles or the synthesis method of the composite tungsten oxide fine particles such as the thermal plasma method or the solid-phase reaction method described later.

(3) Uncured Thermosetting Resin

Uncured thermosetting resin includes uncured resin such as epoxy resin, urethane resin, acrylic resin, urea resin, melamine resin, phenol resin, ester resin, polyimide resin, silicone resin, and unsaturated polyester resin.

These uncured thermosetting resins are cured by applying thermal energy from the near-infrared absorbing fine particles that have, been irradiated with near-infrared irradiation. Then, the uncured thermosetting resin includes a monomer or an oligomer that forms a thermosetting resin by a curing reaction, and a known curing agent that is appropriately added. Further, a known curing accelerator may be added to the curing agent.

(4) Other Components

As described above, the near-infrared curable, ink composition of the present invention includes the composite tungsten oxide having the XRD peak top intensity ratio value of 0.13 or more based on the XRD peak intensity ratio value of 1 on plane (220) of a silicon powder standard sample (640c produced by NIST), and the uncured thermosetting resin.

Then, the near-infrared curable ink composition of the present invention includes other components such as a pigment, a solvent, and a dispersant as required. Therefore, (a) a pigment and a dye, (b) a dispersant, and (c) a solvent will be described in this order.

(a) A Pigment and a Dye

As a pigment that can be used for coloring the near-infrared curable ink composition according to the present invention described above, a famous pigment can be used without particular limitation, and organic pigments such as insoluble pigments and lake pigments and inorganic pigments such as carbon black can be preferably used.

These pigments are preferably present in a dispersed state in the near-infrared curable ink composition according to the present invention. As a method for dispersing these pigments, a known method can be used without any particular limitation.

As described above, the insoluble pigment is not particularly limited, However, for example, azo, azomethane, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, and diketopyrrolopyrrole, etc., are preferably used.

As described above, the pigment is not particularly limited. However, specific pigment names that are preferably used are listed below.

As a pigment for magenta cis red, for example, C. I. Pigment red 2, C.I. I. Pigment red 3, C.I. I. Pigment red 5, C.I. I. Pigment red 6, C.I. I. Pigment red 7, C. I. Pigment red 15, C.I. I. Pigment red 16, C.I. I. Pigment Red 48:1, C. I. Pigment red 53:1, C. I. I. Pigment red 57:1, C.I. I. Pigment red 122, C.I. I. Pigment red 123, C.I. Pigment red 139, C.I.

I. Pigment red 144, C.I. I. Pigment red 149, C. I. Pigment red 166, C.I. I. Pigment red 177, C.I. I. Pigment red 178, C.I. I. Pigment red 202, C.I. I. Pigment red 222, C.I. I. Pigment Violet 19 etc., can be listed.

As a pigment for orange or yellow, for example, C. I. Pigment orange 31, C.I. I Pigment orange 43, C.I. I. Pigment yellow 12, C.I. I. Pigment yellow 13, C. I. Pigment yellow 14, C.I. I. Pigment yellow 15, C.I. I. Pigment yellow 15: 3, C. I Pigment yellow 17, C.I. I. Pigment yellow 74, C.I. I. Pigment yellow 93, C. I. Pigment yellow 128, C.I. I. Pigment yellow 94, and C.I. I. Pigment Yellow 138 etc., can be listed.

As a pigment for green or cyan, for example, C. I. Pigment blue 15, C.I. I. Pigment blue 15: 2, C.I. I. Pigment blue 15: 3, C.I. I. Pigment blue 16, C.I. Pigment blue 60, C.I. I. and Pigment Green 7 etc., can be listed.

As a pigment for black, for example, C. I. Pigment black 1, C.I. I. Pigment black 6, C.I. I. Pigment Black 7 etc., can be listed.

As described above, the inorganic pigment is not particularly limited. However, extender pigments, etc., containing carbon black, titanium dioxide, zinc sulfide, zinc oxide, zinc phosphate, mixed metal oxide phosphate, iron oxide, manganese iron oxide, chromium oxide, ultramarine, nickel or chromium antimony titanium oxide, cobalt oxide, aluminum, aluminum oxide, silicon oxide, Silicate, zirconium oxide, mixed oxide of cobalt and aluminum, molybdenum sulfide, rutile mixed phase pigment, rare earth sulfide, bismuth vanadate, aluminum hydroxide and barium sulfate, are preferable.

The dispersed particle size of the dispersed pigment contained in the near-infrared curable ink composition according to the present invention is preferably 1 nm or more and 100 nm or less. This is because when the dispersed particle size in the pigment dispersion liquid is 1 nm or more and 100 nm or less, storage stability in the near-infrared curable ink composition is good.

The dye used in the present invention is not particularly limited. Either oil-soluble dyes or water-soluble dyes can be used, and yellow dyes, magenta dyes, cyan dyes, and the like can be preferably used.

As a yellow dye, for example aryl or heteryl azo dyes having phenols, naphthols, anilines, pyrazolones, pyridones, open chain active methylene compounds as coupling components; for example azomethine dyes having open chain active methylene compounds as coupling components; for example methine dyes such as benzylidene dyes and monomethine oxonol dyes; for example quinone dyes such as naphthoquinone dyes and anthraquinone dyes, etc., can be listed, and as other dye species, quinophthalone dyes, nitro/nitroso dyes, acridine dyes, and acridinone dyes can be listed. These dyes may exhibit yellow only after part of the chromophore is dissociated, and a counter cation in that case may be an alkali metal or an inorganic cation such as ammonium, or may be an organic cation such as pyridinium, quaternary ammonium salt, and further, may be a polymer cation which has them in a partial structure.

As a magenta dye, for example aryl or heteryl azo dyes having phenols, naphthols, anilines as coupling components; for example azomethine dyes having pyrazolones and pyrazolotriazoles as coupling components; for example methine dyes such as arylidene dyes, styryl dyes, merocyanine dyes, oxonol dyes; carbonium dyes such as diphenylmethane dyes, triphenylmethane dyes, xanthene dyes, for example quinone dyes such as naphthoquinone, anthraquinone, anthrapyridone, and for example condensed polycyclic dyes such as dioxazine dyes, etc., can be listed. These dyes may exhibit magenta only after part of the chromophore is dissociated, and the counter cation in that case may be an alkali metal or an inorganic cation such as ammonium, or may be an organic cation such as pyridinium, quaternary ammonium salt, and further, may be a polymer cation which has them in a partial structure.

As a cyan dye, for example azomethine dyes such as indoaniline dyes and indophenol dyes; polymethine dyes such as cyanine dyes, oxonol dyes, merocyanine dyes; carbonium dyes such as diphenylmethane dyes, triphenylmethane dyes, xanthene dyes; phthalocyanine dyes; anthraquinone dyes; for example aryl or heteryl azo dyes having phenols, naphthols, anilines as coupling components, and indigo/thioindigo dye, can be listed. These dyes may exhibit cyan only after part of the chromophore is dissociated, and a counter cation in that case may be an alkali metal or an inorganic cation such as ammonium, or may be an organic cation such as pyridinium, quaternary ammonium salt, and further may be a polymer cation which has them in a partial structure. Further, black dyes such as polyazo dyes can also be used.

The water-soluble dye used in the present invention is not particularly limited, and direct dyes, acid dyes, food dyes, basic dyes, reactive dyes, and the like can be preferably used.

Specific dye names that are preferably used as the water-soluble dye are listed below.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 21, 223, 224, 225, 226, 227, 232, 233, 240, 241, 242, 243, 247, C.I. Direct Violet 7, 9, 47, 48, 51, 66, 90, 93, 94, 95, 98, 100, 101, C.I. Direct Yellow 8, 9, 11, 12, 7, 28, 29, 33, 35, 39, 41, 44, 50, 53, 68, 86, 87, 93, 95, 96, 98, 100, 106, 108, 109, 110, 130, 132, 142, 144, 161, 163, C. I. Direct Blue 1, 10, 15, 22, 25, 55, 67, 68, 71, 6, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C.I. Direct Black 9, 17, 19, 22, 32, 51, 56, 62, 69, 77, 80, 91, 94, 97, 108, 112, 113, 114, 117, 118, 121,122, 12.5, 132, 146, 154, 166, 168, 173, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C.I. Acid Violet 5, 34, 43, 47, 48, 90, 103, 126, C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227, C.I. Acid Blue 9, 25, 40, 41, 62, 72, 76, 78, 80, 82, 92, 106, 112, 113, 120, 127: 1, 129, 138, 143, 175, 181, 205, 207, 220, 221, 230, 232, 247, 258, 260, 264, 271, 277, 278, 279, 280, 288, 290, 326, C.I. Acid Black 7, 24, 29, 48, 52: 1, 172, C.I. Reactive Red 3, 13, 17, 19, 21, 22, 23, 24, 29, 35, 37, 40, 41, 43, 45, 49, 55, C.I. Reactive violet 1, 3, 4, 5, 6, 7, 8, 9, 16, 17, 22, 23, 24, 26, 27, 33, 34, C.I. Reactive yellow 2, 3, 13, 14, 15, 17, 18, 23, 24, 25, 26, 27, 29, 35, 37, 41, 42, C.I. Reactive blue 2, 3, 5, 8, 10, 13, 14, 15, 17, 18, 19, 21, 25, 26, 27, 28, 29, 38, C.I. Reactive black 4, 5, 8, 14, 21, 23, 26, 31, 32, 34, C.I. Basic Red 12, 13, 14, 15, 18, 22, 23, 24, 25, 27, 29, 35, 36, 38, 39, 45, 46, C.I. Basic violet 1, 2, 3, 7, 10, 15, 16, 20, 21, 25, 27, 28, 35, 37, 39, 40, 48, C.I. Basic yellow 1, 2, 4, 11, 13, 14, 15, 19, 21, 23, 24, 25, 28, 29, 32, 36, 39, 40, C. I. Basic blue 1, 3, 5, 7, 9, 22, 26, 41, 45, 46, 47, 54, 57, 60, 62, 65, 66, 69, 71, C. I. Basic black 8, etc., can be listed.

As described above, a particle size of the colorant pigment and the near-infrared absorbing fine particles contained in the near-infrared curable ink is preferably determined in consideration of the properties of a coating device for the near-infrared curable ink composition.

The near-infrared curable ink composition according to the present invention is a concept including the near-infrared curable ink composition which does not contain the above-described pigment and dye.

(b) A Dispersant

The near-infrared absorbing fine particles of the present invention may be dispersed in an appropriate uncured monomer of a thermosetting resin or an appropriate solvent described later, together with an appropriate dispersant. This is because by adding an appropriate dispersant, the near-infrared absorbing fine particles can be easily dispersed in the near-infrared curable ink, and it can be expected to suppress variation in curing in the coating layer of the near-infrared curable ink.

As the dispersant, commercially available dispersants can be appropriately used. However, a dispersant with a molecular structure having a main chain of polyester, polyacryl, polyurethane, polyamine, polycaptolactone, polystyrene, and having an amino group, an epoxy group, a carboxyl group, a hydroxyl group, a sulfo group, etc., as a functional group, is preferable. The reason is as follows: the dispersant having such a molecular structure is hardly altered when the near-infrared curable ink coating layer of the present invention is irradiated with near-infrared rays intermittently for several tens of seconds. Accordingly, there will be no problems such as coloring due to the alteration.

As preferable examples of the commercially available dispersants, SOLPERSE 3000, SOL SPERSE 9000, SOL SPERSE 11200, SOL SPERSE 13000, SOLPERSE 13240, SOLPERSE 13650 SOLPERSE 13940, SOLPERSE 16000, SOLPERSE 17000, SOLSPERSE 18000, SOLSPERSE 20000, SOLSPERSE 21000, SOLSPERSE 24000SC, SOLSPERSE 24000GR, SOLSPERSE 26000, SOLSPERSE 27000, SOLSPERSE 28000, SOLSPERSE 31845, SOLSPERSE 32000, SOLSPERSE 32500, SOLSPERSE 32550, SOLSPERSE 32600, SOLSPERSE 33000, SOLSPERSE 33500, SOLSPERSE 34750, SOLSPERSE 35100, SOLSPERSE 35200, SOLSPERSE 36600, SOLSPERSE 37500, SOLSPERSE 38500, SOLSPERSE 39000, SOLSPERSE 41000, SOLSPERSE 41090, SOLSPERSE53095, SOLSPERSE55000, SOLSPERSE56000, SOLSPERSE76500, etc. made by Nippon Lubrizol Corporation;

Disperbyk-101, Disperbyk-103, Disperbyk-107, Disperbyk-108, Disperbyk-109, Disperbyk-110, Disperbyk-111 Disperbyk-112, Disperbyk-116, Disperbyk-130, Disperbyk-140, Disperbyk-142, Disperbyk-145, Disperbyk-154, Disperbyk-161, Disperbyk-162, Disperbyk-163, Disperbyk-164, Disperbyk-165, Disperbyk-166, Disperbyk-167, Disperbyk-168, Disperbyk-170, Disperbyk-171, Disperbyk-174, Disperbyk-180, Disperbyk-181, Disperbyk-182, Disperbyk-1.83, Disperbyk-184, Disperbyk-185, Disperbyk-190, Disperbyk-2000, Disperbyk-2001, Disperbyk-2020, Disperbyk-202 Disperbyk-2050, Disperbyk-2070, Disperbyk-2095, Disperbyk-2150, Disperbyk-2155, Anti-Terra-U, Anti-Terra-203, Anti-Terra-204, BYK-P104, BYK-P104S, BYK-220S, BYK-6919, etc., made by Big Chemie Japan;

EFKA4008, EFKA4046, EFKA4047, EFKA4015, EFKA4020, EFKA4050, EFKA4055, EFKA4060, EFKA4080, EFKA4300, EFKA4330, EFKA4400, EFKA4401, EFKA4402, EFKA4403, EFKA4500, EFKA4510, EFKA4530, EFKA4550, EFKA4560, EFKA4585, EFKA4800, EFKA5220, EFKA6230, JONCRYL67, JONCRYL678, JONCRYL586, JONCRYL611, JONCRYL680, JONCRYL682, JONCRYL690, JONCRYL819, JONCRYL-JDX5050, etc., made by BASF Japan; and Addisper PB-711, Addisper PB-821, Addisper PB-822, etc., made by Ajinomoto Fine Techno Co., Ltd. can be listed.

(c) A Solvent

In the near infrared curable ink composition according to the present invention, it is also preferable to use a solvent together with the monomer of the thermosetting resin in an uncured state.

In this case, as a solvent for the near-infrared curable ink composition, a reactive organic solvent is also preferably used, which has a functional group such as an epoxy group, and reacts with thermosetting resin monomers and oligomers contained in thermosetting resin in an uncured state during a curing reaction of the thermosetting resin described later.

The reason is as follows: by adding the solvent, viscosity of the near-infrared curable ink composition can be appropriately adjusted, and as a result, applicability and smoothness of the coating layer can be easily secured.

As the solvent of the near-infrared curable ink composition according to the present invention, for example water, alcohols such as methanol, ethanol, propanol, butanol, isopropyl alcohol, isobutyl alcohol, diacetone alcohol, ethers such as methyl ether, ethyl ether, propyl ether, esters, ketones such as acetone, methyl ethyl ketone, diethyl ketone, cyclohexanone, inbutyl ketone, various organic solvents such as ethylene glycol monoethyl ether, ethylene glycol monobutyl ether, polyethylene glycol, polypropylene glycol, can be used.

(5) Near-Infrared Curable Ink Composition

As described above, by adding the near-infrared absorbing fine particles of the present invention to the uncured thermosetting resin, or by adding the uncured thermosetting resin after dispersing the near-infrared absorbing fine particles of the present invention in a suitable solvent, it is possible to obtain the near-infrared curable ink composition according to the present invention, which is provided on a predetermined substrate and has excellent adhesion to the substrate when irradiated with near-infrared rays and cured. In addition, the near-infrared curable ink composition according to the present invention is suitable for sterolithography including: coating the substrate with a predetermined amount of the ink composition; irradiating the coated matter with near-infrared rays, curing the coated matter to heap up; and forming a three-dimensional object to be described later, in addition to conventional ink applications.

As described above, it is also preferable to obtain the near-infrared curable ink composition containing the composite tungsten oxide as the near-infrared absorbing fine particles, the solvent, the dispersant, and the uncured thermosetting resin, which the solvent is removed, or containing the composite tungsten oxide as the near-infrared absorbing fine particles, the dispersant, and the uncured thermosetting resin without using the solvent.

According to the near-infrared curable ink composition containing the composite tungsten oxide as the near-infrared absorbing fine particles, the dispersant, and the uncured thermosetting resin without containing the solvent, the process related to the volatilization of the solvent can be omitted in the post-process, and efficiency of a curing reaction is good.

The method for removing the solvent is not particularly limited. However, it is possible to use a heating distillation method etc., in which a pressure reduction operation is added.

As an amount of the composite tungsten oxide, which is the near-infrared absorbing fine particles, contained in the near-infrared curable ink according to the present invention, an amount sufficient cure the uncured thermosetting resin during the curing reaction may be appropriately added. Accordingly, the amount of the near-infrared absorbing fine particles per application area of the near-infrared curable ink may be determined in consideration of a coating thickness of the near infrared curable ink.

The method for dispersing the near-infrared absorbing fine particles in the solvent is not particularly limited, but it is preferable, to use a wet medium mill.

Then, in dispersing the composite tungsten oxide fine particles, a process condition for dispersion is set so as to ensure the XRD peak top intensity ratio value of 0.13 or more based on the XRD peak intensity ratio value of 1 on plane (220) of a silicon powder standard sample (640c produced by NIST). With this setting, the infrared curable ink composition exhibits excellent optical properties.

[2] Stereolithography

The near-infrared curable ink according to the present invention has visible light transmittance. Therefore, it is possible to obtain the near-infrared cured layer of the present invention having excellent adhesion to a predetermined substrate when a predetermined amount of the near infrared curable ink composition is applied to obtain a coating layer, which is then irradiated with near-infrared rays and cured. Further, a colored layer can be easily obtained by adding at least one pigment or dye to the near infrared curable ink. The colored layer can be used for a color filter of a liquid crystal display, because in the colored film, there is almost no influence the color by the near-infrared absorbing fine particles.

The reason why the excellent adhesion described above is obtained is as follows: the near-infrared absorbing fine particles absorb irradiated near-infrared rays and generate heat, and a heat energy of the generated heat promotes reactions such as a polymerization reaction, a condensation reaction, and an addition reaction monomers anti oligomers contained in the uncured thermosetting resin. Further, the solvent is also volatilized by the heat generation of the near-infrared absorbing fine particles by irradiation of the near-infrared rays.

On the other hand, even if the near-infrared cured layer of the present invention is further irradiated with the near-infrared rays, the cured layer does not remelt. The reason is as follows: since the near-infrared cured layer of the present invention contains the thermosetting resin obtained by curing the uncured thermosetting resin, it does not remelt even if the near-infrared absorbing fine particles generate heat by irradiation of the near-infrared rays.

Such a property is particularly suitable for stereolithography to perform the following lamination repeatedly: coating the substrate with a predetermined amount of the ink composition of the present invention; irradiating the coated matter with near-infrared rays, curing the coated matter to heap up: and forming a three-dimensional object, combined with the excellent adhesion to the substrate described above.

Of course it is also preferable that the substrate is coated with a predetermined amount of the near-infrared curable ink composition of the present invention, and the coated matter is irradiated with the near-infrared rays and cured, to obtain the near-infrared cured layer of the present invention.

The material of the substrate used in the present invention is not particularly limited, and for example paper, PET, acrylic, urethane, polycarbonate, polyethylene, ethylene vinyl acetate copolymer, vinyl chloride, fluorine resin, polyimide, polyacetal, polypropylene, nylon, etc., can be preferably used, according to various purposes.

As a method for curing the near-infrared curable ink composition of the present invention, infrared irradiation is preferable, and near-infrared irradiation is more preferable. The near-infrared rays have a large energy density and can efficiently impart, energy necessary for the resin in the ink composition to cure.

It is also preferable to cure the near-infrared curable ink composition of the present invention by combining infrared irradiation and an arbitrary method selected from known methods. For example, methods such as heating, blowing, and electromagnetic wave irradiation may be used in combination with the infrared irradiation.

Note that in the present invention, the infrared irradiation refers to electromagnetic waves having a wavelength in a range from 0.1 µm to 1 mm, the near-infrared rays refer to infrared rays having a wavelength of 0.75 to 4 µm, and far-infrared rays refer to infrared rays having a wavelength of 4 to 1000 µm. Generally, the effect of the present invention can be obtained regardless of which infrared rays called far-infrared rays or near-infrared rays are irradiated. However, in the case of the irradiation of the near-infrared rays, the thermosetting resin can be cured efficiently in a shorter time.

Further in the present invention, microwave refers to electromagnetic waves having a wavelength in a range from 1 mm to 1 m. The microwave to be irradiated preferably has a power of 200 to 1000 W. If the power is 200 W or more, vaporization of the organic solvent remaining in the ink is promoted, and if it is 1000 W or less, the irradiation conditions are mild, and there is no risk of altering the substrate or the thermosetting resin.

A preferable infrared irradiation time for the near-infrared curable ink composition of the present invention varies depending on an energy and a wavelength to be irradiated, the composition of the near-infrared curable ink, and the coating amount of the near-infrared curable ink. Generally, irradiation for 0.1 seconds or more is preferable. When the irradiation time is 0.1 seconds or more, it is possible to perform infrared irradiation within a range that falls within the preferable power described above. It is possible to sufficiently dry the solvent in the ink composition by extending the irradiation time. However, the irradiation time is preferably within 30 seconds, ore preferably within 10 seconds, in consideration of high-speed printing and coating.

The infrared irradiation source may be obtained directly from a heat source, or effective infrared irradiation may be obtained therefrom through a heat medium. For example, the infrared rays can be obtained by discharge lamps such as mercury, xenon, cesium, and sodium, carbon dioxide lasers, and heating of electrical resistors such as platinum, tungsten, nichrome, and cantal. A preferred radiation source is a halogen lamp. The halogen lamp has advantages such as good thermal efficiency and quick start-up.

Irradiation of the infrared rays to the near-infrared curable ink composition of the present invention may be performed from the near-infrared curable ink coating surface side or from the back surface side. It is also preferable to irradiate simultaneously from both sides, and it is also preferable to combine with temperature rising drying and ventilation drying. Further, it is more preferable to use a light collector if necessary. By combining these methods, curing is possible by short-time infrared irradiation.

EXAMPLE

The present invention will be specifically described, with reference to examples. However, the present invention is not limited thereto.

First, a method for evaluating evaluation items according to examples will be described in an order of: (1) Content of a volatile component, (2) XRD peak top intensity ratio value, (3) Dispersed particle size, (4) Evaluation of cured layer containing composite tungsten oxide fine particles, (5) Average particle size in the cured layer.

(1) Content of a Volatile Component

The content of the volatile component in the composite tungsten oxide fine particles in Examples and Comparative Examples was obtained as follows: a measurement sample was heated from room temperature to 125° C. within 1 minute from the start of measurement and held at 125° C. for 9 minutes, using a moisture meter MOC63u made by Shimadzu Corporation. Then, a weight reduction rate of the measurement sample 10 minutes after the start of measurement was defined as the content of the volatile component.

(2) XRD Peak Top Intensity Ratio Value

An X-ray diffraction pattern was measured by a powder X-ray diffraction method (θ-2θ method) using a powder X-ray diffraction apparatus (X'Pert-PRO/MPD made by Spectris Corporation, PANalytical). In order to ensure objective quantification, the X-ray diffraction pat of the silicon powder standard sample was measured each time the X-ray diffraction pattern of the composite tungsten oxide fine particles was measured, and the peak intensity ratio was calculated each time.

(3) Dispersed Particle Size

The dispersed particle size of the composite tungsten oxide fine particles in the fine particle dispersion liquid was measured by Microtrac particle size distribution analyzer using the principle of dynamic light scattering (model: UPA-UT, made by Nikkiso Coo, Ltd.).

(4) Evaluation of Cured Layer Containing Composite Tungsten Oxide Fine Particles Visible light transmittance, solar absorptivity, and haze described below were evaluated, for the cured layer containing the composite tungsten oxide fine particles prepared by coating 3 mm thick blue glass plate with the near-infrared curable ink composition.

(5) Average Particle Size in the Cured Layer

The average particle size of the composite tungsten oxide fine particles dispersed in the near-infrared curable ink composition was measured by observing a transmission electron microscope image of a cross section of the cured layer prepared by coating of the near infrared curable ink composition. The transmission electron microscope image was observed using a transmission electron microscope (HF-2200, made by Hitachi High-Technologies Corporation). The transmission electron microscope image was processed with an image processing apparatus, the particle size of 100 composite tungsten oxide fine particles was measured, and an average value was defined as an average particle size.

Example 1

0.216 kg of $Cs_2CO_3$ was dissolved in 0.330 kg of water, which was then added to 1.000 kg of $H_2WO_4$, sufficiently stirred, and then dried to obtain a nixed powder of $Cs_{0.33}WO_3$ as a target composition.

Next, the high-frequency plasma reaction device described in FIG. 1 was used, and the inside of the reaction system was evacuated to about 0.1 Pa (about 0.001 Torr) by a vacuum evacuation device, and then the inside of the reaction system was completely replaced with argon gas to obtain a flow system of 1 atm. Thereafter, argon gas was introduced as a plasma gas into the reaction vessel at a flow rate of 30 L/min, and the argon gas and a helium gas were introduced as a sheath gas from a sheath gas feed port at a flow rate of 55 L/min of argon gas and 5 L/min of helium gas. Then, high-frequency power was applied to a water cooled copper coil for generating high-frequency plasma, to generate high-frequency plasma. At this time, in order to generate thermal plasma having a high temperature part of 10000 to 15000 K, the high-frequency power was set to 40 KW.

In this way, after generating the high-frequency plasma, the mixed powder was supplied into the thermal plasma at a rate of 50 g/min while feeding the argon gas as a carrier gas at a flow rate of 9 L/min from the gas feeding device 11.

As a result, the mixed powder was instantaneously evaporated in the thermal plasma, and rapidly solidified in a process of reaching the plasma tail flame part, resulting in fine particles. The generated fine particles of example 1 before pulverization were deposited on a recovery filter.

The production conditions are shown in table 1.

The deposited fine particles were collected to obtain the composite tungsten oxide fine particles (referred to as fine particles a hereafter) according to Example 1. An X-ray diffraction pattern was measured by a powder X-ray diffraction method (θ-2θ method) using a powder X-ray diffractometer (X'Pert-PRO/MPD made by Spectris Co., Ltd. PANalytical).

Figure 2:
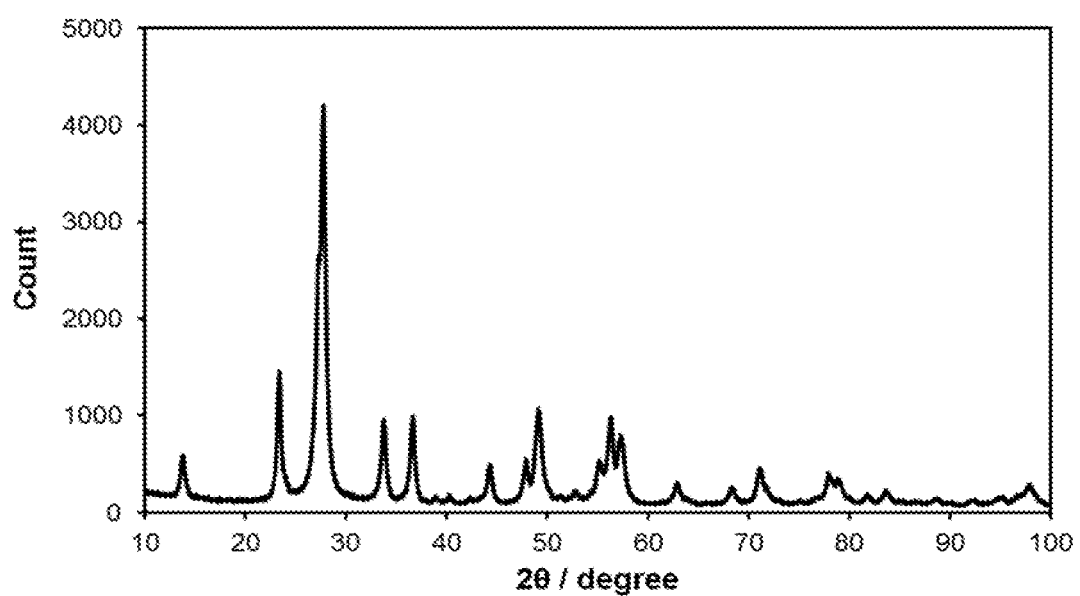
FIG. 2 is an X-ray diffraction pattern of fine particles before pulverization according to Example 1.

The X-ray diffraction pattern of the obtained fine particles is shown in FIG. 2. As a result of phase identification, the obtained fine particles were identified as a hexagonal $Cs_{0.33}WO_3$ single phase. Further, when crystal structure analysis by the Rietveld analysis method was performed using the X-ray diffraction pattern, the crystallite size of each obtained fine particles was 18.8 nm. Further, the peak top intensity value of the X-ray diffraction pattern of the obtained fine particles before pulverization was 4200 counts.

The composition of the obtained fine particles before pulverization was examined by ICP emission spectrometry. As a result, Cs concentration was 13.6 mass %, W concentration was 65.3 mass %, and a molar ratio of Cs/W was 0.29. It was confirmed that a remained part other than Cs and W was oxygen and no other impurity element contained in an amount of 1 mass % or more was present.

When a BET specific surface area of the obtained fine particles before pulverization was measured using a BET specific surface area measuring device (HM model 1208 made by Mountech), it was 60.0 m$^2$/g. Note that nitrogen gas having a purity of 99.9% was used for measurement of the BET specific surface area.

when the content of the volatile component of the fine particle a was measured, it was 1.6 mass %.

20 parts by mass of fine particles a 65 parts by weight of methyl isobutyl ketone, and 15 parts by weight of an acrylic dispersant were mixed. These raw materials were loaded into a paint shaker containing 0.3 mmϕZrO 2 beads and pulverized and dispersed for 1 hour to obtain a fine particle dispersion liquid of fine particles a (referred to as fine particle dispersion liquid a hereafter).

The peak top intensity value of the X ray diffraction pattern of the composite tungsten oxide fine particles contained in the fine particle dispersion liquid a, that is, the composite tungsten oxide fine particles after pulverization and dispersion treatment, was 3600 counts, and a peak position was 2θ=27.8°.

On the other hand, a silicon powder standard sample (640c made by NIST) was prepared, and the peak intensity value was measured with (220) plane as a reference in the silicon powder standard sample, then it was found to be 19800 counts.

Accordingly, it was found that the XRD peak intensity ratio value of the composite tungsten oxide fine particles in the fine particle dispersion liquid a according to Example 1 was 0.18.

Further, the crystallite size of the composite tungsten oxide fine particles after the pulverization and dispersion treatment according to Example 1 was 24.7 nm.

Further, the dispersed particle size in the fine particle dispersion liquid a according to Example 1 was measured, and it was found to be 80 nm.

25 parts by weight of the fine particle dispersion liquid a and 75 parts by weight of thermosetting ink (MEG screen ink (medium) made by Teikoku Ink Manufacturing Co., Ltd.) containing a commercially available one-component uncured thermosetting resin were mixed, and a near-infrared curable ink (referred to as ink A hereafter) according to Example 1 was obtained.

3 mm thick blue plate glass was coated with ink A using a bar coater (No. 10), and a line heater HYP-14N (output 980 W) made by Hibek Co., Ltd. was installed as a near-infrared irradiation source at a height of 5 cm from a coated surface, and a cured layer according to Example 1 (referred to as cured layer A hereafter) was obtained by irradiation of the near infrared rays for 10 seconds.

The layer thickness of the obtained cured layer A was 20 μm, and it was confirmed visually that the cured layer A was transparent.

The average particle size of the composite tungsten oxide fine particles dispersed in the cured layer A was calculated by an image processing apparatus using a transmission electron microscope image, and it was found to be 24 nm.

The adhesion of the cured layer A was evaluated by the following method.

100 grid-shaped cuts were made using a cutter guide with a 1 mm gap, and 18 mm width tape (Cellotape (registered trademark) CT-18 made by Nichiban Co., Ltd.) was adhered to the cut surface on the grid, and 2.0 kg roller was reciprocated 20 times so that the tape was completely adhered, and thereafter it was peeled off rapidly at a peeling angle of 180 degrees, and the number of peeled grids was counted.

The number of the peeled grids was zero.

Even when the cured layer A was irradiated with the near-infrared rays for 20 seconds under the same conditions as in the case of curing the above-described near-infrared curable ink, the cured layer did not remelt.

The evaluation results are shown in table 2.

Examples 2 to 6

The composite tungsten oxide fine particles and the composite tungsten oxide fine particle dispersion liquid of examples 2 to 6 were produced in the same manner as in the example 1, except that the carrier gas flow rate, the plasma gas flow rate, the sheath gas flow rate, and the raw material feed rate were changed.

The production conditions are shown in table 1.

Further, evaluation similar to that of examples 1 was performed for the composite tungsten oxide fine particles and the composite tungsten oxide fine particle dispersion liquid of examples 2 to 6.

The evaluation results are shown in Table 2.

Further, the near-infrared curable ink of examples 2 to 6 were obtained, and the cured layers of examples 2 to 6 were produced and evaluated in the same manner as the near-infrared curable ink of example 1, except that the composite tungsten oxide fine particle dispersion liquids of examples 2 to 6 were used.

The layer thicknesses of the cured layers obtained in examples 2 to 6 were all 20 μm, and was confirmed to be transparent visually, and an adhesion test of the cured layers according to Examples 2 to 6, shows that the number of the peeled grids was zero.

The evaluation results are shown in table 2.

Example 7

0.216 kg of $Cs_2CO_3$ was dissolved in 0.330 kg of water, the obtained solution was added to 1.000 kg of $H_2WO_4$, sufficiently stirred, and then dried to obtain a dried product. While feeding 2% $H_2$ gas with $N_2$ gas as a carrier, the dried product was heated, and fired at temperature of 800° C. for 30 minutes. Thereafter, the composite tungsten oxide fine particles (referred to as particles g hereafter) of example 7 were obtained by the solid-phase reaction method of firing at 800° C. for 90 minutes under an $N_2$ gas atmosphere.

20 parts by weight of fine particles g and 80 parts by weight of water were mixed to obtain about 3 kg of slurry. Note that a dispersant was not added to the slurry.

The slurry was put into a medium stirring mill together with beads, and pulverized and dispersed for 4 hours. Note that as the medium stirring mill, a horizontal cylindrical annular type (made by Ashizawa Co., Ltd.) was used, and zirconia was used for an inner wall of a vessel and a rotor (rotary stirring portion). Further, beads made of YSZ (Yttria-Stabilized Zirconia) having a diameter of 0.1 mm were used as the beads. A rotational speed of the rotor was 14 rpm/second, and a pulverization and dispersion treatment were performed at a slurry flow rate of 0.5 kg/min, to obtain the composite tungsten oxide fine particle dispersion (referred to as fine particle dispersion liquid g hereafter).

X-ray diffraction pattern of the composite tungsten oxide fine particles contained in the fine particle dispersion liquid g was measured. As a result of phase identification, the obtained fine particles were identified as a hexagonal $Cs_{0.33}WO_3$ single phase.

Further, the near-infrared curable ink of example 7 (referred to as ink G hereafter) was prepared in the same manner as in example 1 except that the fine particle dispersion liquid g was used instead of the fine particle dispersion liquid a.

Further, the cured layer of example 7 (referred to as cured layer G hereafter) was prepared and evaluated in the same manner as in example 1 except that ink G was used instead of ink A.

The layer thicknesses of the obtained cured layer was 20 µm, and was confirmed to be transparent visually, and the adhesion test of the cured layer shows that the number of the peeled grids was zero.

The evaluation results are shown in tables 1 and 2.

Example 8

The near-infrared curable ink (referred to as ink H hereafter) of example 8 was prepared in the same manner as in example 1, except that 25 parts by weight of the fine particle dispersion liquid g, 37.5 parts by weight of an uncured bisphenol A type epoxy resin and 37.5 parts by weight of a curing agent added with a curing accelerator were mixed. Note that the curing agent is a mixture of a phenol resin and imidazole.

A cured layer of example 8 (referred to as cured layer H hereafter) was prepared and evaluated in the same manner as in example 1 except that ink H was used instead of ink A.

The layer thickness of the obtained cured layer H was 20 µm, and it was confirmed visually that the layer was a transparent cured layer having a yellow coloring. The yellow coloring is considered to be caused by the resin. Then, the adhesion test of the cured layer H shows that the number of peeled grids was zero.

The production conditions and evaluation results are shown in tables 1 and 2.

Example 9

Fine particles i, fine particle dispersion liquid i and near-infrared curable ink (referred to as ink I hereafter) were produced in the same manner as in example 1, except that 0.148 kg of $Rb_2CO_3$ was dissolved in 0.330 kg of water, added to 1.000 kg of $H_2WO_4$ and sufficiently stirred, and then dried to obtain $Rb_{0.32}WO_3$ mixed powder which is a targeted composition.

The cured layer of example 9 (referred to as a cured layer I hereafter) was prepared and evaluated in the same manner as in example 1, except that ink I was used instead of ink A.

The layer thickness of the obtained cured layer I was 20 µm, and it was confirmed visually that the cured layer was transparent. Then, the adhesion test of the cured layer I shows that the number of peeled grids was zero.

The production conditions and evaluation results are shown in tables 1 and 2.

Example 10

17 parts by weight of fine particle dispersion liquid a and 83 parts by weight of a commercially available thermosetting ink containing one component type uncured thermosetting resin (MEG screen ink (medium) made by Teikoku Manufacturing Co., Ltd.) were mixed, to prepare the near-infrared curable ink of example 10 (referred to as ink J hereafter).

The cured layer of example 10 (referred to as a cured layer J hereafter) was prepared and evaluated in the same manner as in example 1, except that ink J was used instead of ink A.

The layer thickness of the obtained cured layer J was 20 µm, and it was confirmed visually that the cured layer was transparent. Then, the adhesion test of the cured layer J shows that the number of peeled grids was zero.

The production conditions and evaluation results are shown in tables 1 and 2.

Comparative Example 1

The composite tungsten oxide fine particles of comparative example 1 (referred to as fine particles k hereafter) were produced in the same manner as in the example 1, except that the carrier gas flow rate, the plasma gas flow rate, the sheath gas flow rate, and the raw material feed rate were changed.

Further, the dispersion liquid of fine particles k (hereinafter referred to as fine particle dispersion liquid k) was obtained except that the fine particles k were used instead of the fine particles a.

The near-infrared curable ink (referred to as ink K hereafter) of comparative example 1 was prepared in the same manner as in example 1 except that the fine particle dispersion liquid k was used instead of the fine particle dispersion liquid a.

Further, the cured layer of comparative example 1 (referred to as a cured layer K hereafter) was prepared and evaluated in the same manner as in example 1 except that ink K was used instead of ink A.

The layer thickness of the obtained cured layer K was 20 µm, and it was confirmed visually that the cured layer was transparent. Then, the adhesion test of the cured layer K shows that the number of peeled grids was 25.

The production conditions and evaluation results are shown in tables 1 and 2.

Comparative Example 2

The composite tungsten oxide fine particles of comparative example 2 (referred to as fine particles l hereafter) were produced in the same manner as in the example 1, except that the carrier gas flow rate, the plasma gas flow rate, the sheath gas flow rate, and the raw material feed rate were changed.

Further, the dispersion liquid of fine particles l (referred to as fine particle dispersion liquid 1 hereafter) was obtained in the same manner as in example 1, except that the fine particles l were used instead of the fine particles a.

The near-infrared curable ink (referred to as ink L hereafter) of comparative example 2 was prepared in the same manner as in example 1, except that the fine particle dispersion liquid 1 was used instead of the fine particle dispersion liquid a.

Further, the cured layer of comparative example 2 (referred to as a cured layer L hereafter) was produced and evaluated in the same manner as in example 1, except that ink L was used instead of ink A.

The layer thickness of the obtained cured layer L was 20 µm, and it was confirmed visually that the cured layer was transparent. Then, the adhesion test of the cured layer L shows that the number of peeled grids was 22.

The production conditions and evaluation results are shown in tables 1 and 2.

Comparative Example 3

The composite tungsten oxide fine particles (referred to as fine particles m hereafter) of comparative example 3 were produced in the same manner as in example 1, except that in order to generate a thermal plasma having a high temperature part of 5000 to 10,000 K, a high frequency power was set to 1.5 KW.

Further, the dispersion liquid of fine particles m (referred to as fine particle dispersion liquid m hereafter) were obtained in the same manner as in example 1, except that the fine particles m were used instead of the fine particles a.

The near-infrared curable ink (referred to as ink M hereafter) of comparative example 3 was prepared in the same manner as in example 1, except that the fine particle dispersion liquid m was used instead of the fine particle dispersion liquid a.

Further, the cured layer of comparative example 3 (referred to as a cured layer M hereafter) was prepared and evaluated in the same manner as in example 1, except that ink M was used instead of ink A.

The layer thickness of the obtained cured layer L was 20 μm, and it was confirmed visually that the cured layer was transparent. Then, the adhesion test of the cured layer L shows that the number of peeled grids was 29.

The production conditions and evaluation results are shown in tables 1 and 2.

Comparative Example 4

20 parts by weight of fine particles g of example 7 and 80 parts by weight of water were mixed to prepare about 3 kg of slurry. Note that dispersant is added to this slurry. This slurry was put into a medium stirring mill together with beads and pulverized and dispersed for 50 hours. Note that as the medium stirring mill, a horizontal cylindrical annular type (made by Ashizawa Co., Ltd.) was used, and zirconia was used for an inner wall of a vessel and a rotor (rotary stirring portion). Further, beads made of YSZ (Yttria-Stabilized Zirconia) having a diameter of 0.1 mm were used as the beads. A rotational speed of the rotor was 14 rpm/second, and a pulverization and dispersion treatment were performed at a slurry flow rate of 0.5 kg/min, to obtain the composite tungsten oxide fine particle dispersion liquid. Then, water was removed to obtain fine particles n. 20 parts by mass of fine particles n, 65 parts by weight of methyl isobutyl ketone, and 15 parts by weight of an acrylic dispersant were mixed.

These raw materials were loaded into a paint shaker containing 0.3 mmφ$ZrO_2$ beads, and dispersion treatment was performed for 0.25 hours to obtain a fine particle dispersion liquid of fine particles n (referred to as fine particle dispersion liquid n hereafter).

The near-infrared curable ink (referred to as ink N hereafter) of comparative example 4 was prepared in the same manner as in example 7, except that the fine particle dispersion liquid n was used instead of the fine particle dispersion liquid a.

Further, the cured layer of comparative example 4 (referred to as cured layer N hereafter) was prepared and evaluated in the same manner as in example 1, except that ink N was used instead of ink A.

The layer thickness of the obtained cured layer N was 20 μm, and it was confirmed visually that the cured layer was transparent. Then, the adhesion test of the cured layer N shows that the number of peeled grids was 28.

The production conditions and evaluation results are shown in tables 1 and 2.

Comparative Example 5

50 parts by weight of fine particle dispersion liquid n of comparative example 4 and 50 parts by weight of a commercially available thermosetting ink containing one component type uncured thermosetting resin (MEG screen ink (medium) made by Teikoku Manufacturing Co., Ltd.) were mixed, to prepare the near-infrared curable ink of comparative example 5 (referred to as ink O hereafter).

The cured layer of comparative example 5 (referred to as a cured layer O hereafter) was prepared and evaluated in the same manner as in example 1, except that ink O was used instead of ink A.

The layer thickness of the obtained cured layer O was 20 μm, and it was confirmed visually that the cured layer was transparent. Then, the adhesion test of the cured layer O shows that the number of peeled grids was 40.

The production conditions and evaluation results are shown in tables 1 and 2.

TABLE 1

| | | Firing condition | | | | | | | | |
|---|---|---|---|---|---|---|---|---|---|---|
| | | Thermal plasma method | | | | | | Solid-phase reaction method | | |
| | Raw material | Plasma temperature [K] | a [kW] | Carrier gas (Ar) (L/min) | Plasma gas(Ar) (L/min) | Sheath gas (L/min) | b (g/min) | c [° C.] | Furnace gas | Firing time [min] |
| Example 1 | $Cs_2CO_3$ & $H_2WO_4$ | 10000~15000 | 40 | 9 | 30 | Ar55 He5 | 50 | — | | |
| Example 2 | | 10000~15000 | 40 | 8 | 30 | Ar55 He5 | 25 | — | | |
| Example 3 | | 10000~15000 | 40 | 6 | 30 | Ar55 He5 | 25 | — | | |
| Example 4 | | 10000~15000 | 40 | 9 | 45 | Ar55 He5 | 50 | — | | |
| Example 5 | | 10000~15000 | 40 | 9 | 30 | Ar65 He5 | 50 | — | | |
| Example 6 | | 10000~15000 | 40 | 6 | 45 | Ar55 He5 | 25 | — | | |

TABLE 1-continued

| | | Firing condition | | | | | | | |
|---|---|---|---|---|---|---|---|---|---|
| | | Thermal plasma method | | | | | Solid-phase reaction method | | |
| | Raw material | Plasma temperature [K] | a [kW] | Carrier gas (Ar) (L/min) | Plasma gas(Ar) (L/min) | Sheath gas (L/min) | b (g/min) | c [° C.] | Furnace gas | Firing time [min] |
| Example 7 | | — | | | | | | 800 | $N_2$ carrier, 2% $H_2$ | 30 |
| | | | | | | | | 800 | $N_2$ atmosphere | 90 |
| Example 8 | | — | | | | | | 800 | $N_2$ carrier, 2% $H_2$ | 30 |
| | | | | | | | | 800 | $N_2$ atmosphere | 90 |
| Example 9 | $Rb_2CO_3$ & $H_2WO_4$ | 10000~15000 | 40 | 9 | 30 | Ar55 He5 | 50 | | — | |
| Example 10 | $Cs_2CO_3$ & $H_2WO_4$ | 10000~15000 | 40 | 9 | 30 | Ar55 He5 | 50 | | — | |
| Com. Ex. 1 | $Cs_2CO_3$ & $H_2WO_4$ | 10000~15000 | 40 | 3 | 30 | Ar55 He5 | 15 | | — | |
| Com. Ex. 2 | | 10000~15000 | 40 | 9 | 15 | Ar55 He5 | 50 | | — | |
| Com. Ex. 3 | | 5000~10000 | 15 | 9 | 30 | Ar55 He5 | 50 | | — | |
| Com. Ex. 4 | | — | | | | | | 800 | $N_2$ carrier, 2% $H_2$ | 30 |
| | | | | | | | | 800 | $N_2$ atmosphere | 90 |
| Com. Ex. 5 | | — | | | | | | 800 | $N_2$ carrier, 2% $H_2$ | 30 |
| | | | | | | | | 800 | $N_2$ atmosphere | 90 |

Com. Ex. = Comparative Example
a = High-frequency power
b = Raw material feed rate
c = Furnace temperature

TABLE 2

| | Crystal system | Hetero Phase | Peak top intensity | | Peak top intensity of standard sample on (220) plane | Peak top intensity ratio | 2θ at peak position [°] | BET [m²/g] | x/y | Crystal lite size [nm] | c | | |
|---|---|---|---|---|---|---|---|---|---|---|---|---|---|
| | | | e (Count) | f (Count) | | | | | | | a [nm] | b [nm] | d [number] |
| Example 1 | Hexagonal crystal | None | 4200 | 3600 | 19800 | 0.18 | 27.8 | 60.0 | 0.29 | 24.7 | 80 | 24 | 0 |
| Example 2 | | | 4700 | 3700 | 19800 | 0.19 | 27.8 | 51.6 | 0.29 | 24.5 | 80 | 24 | 0 |
| Example 3 | | | 5400 | 4000 | 19800 | 0.20 | 27.8 | 41.6 | 0.29 | 23.1 | 80 | 22 | 0 |
| Example 4 | | | 4500 | 3700 | 19800 | 0.19 | 27.8 | 54.8 | 0.29 | 23.2 | 80 | 22 | 0 |
| Example 5 | | | 4400 | 3600 | 19800 | 0.18 | 27.8 | 57.8 | 0.29 | 22.7 | 80 | 21 | 0 |
| Example 6 | | | 5800 | 4100 | 19800 | 0.21 | 27.8 | 37.8 | 0.30 | 21.3 | 80 | 20 | 0 |
| Example 7 | | | 4200 | 4200 | 19800 | 0.21 | 27.8 | 42.6 | 0.33 | 23,7 | 80 | 24 | 0 |
| Example 8 | | | 4200 | 4200 | 19800 | 0.21 | 27.8 | 42.6 | 0.33 | 23,7 | 80 | 24 | 0 |
| Example 9 | | | 4000 | 3000 | 19800 | 0.15 | 27.9 | 62.5 | 0.32 | 17.2 | 70 | 17 | 0 |
| Example 10 | | | 4200 | 3600 | 19800 | 0.18 | 27.8 | 60.0 | 0.29 | 24.7 | 80 | 24 | 0 |
| Com. Ex. 1 | Hexagonal crystal | None | 1000 | 1100 | 19800 | 0.06 | 27.8 | 90.2 | 0.29 | 8.3 | 80 | 22 | 25 |
| Com. Ex. 2 | | | 1100 | 1100 | 19800 | 0.06 | 27.8 | 86.0 | 0.29 | 9.5 | 80 | 24 | 22 |
| Com. Ex. 3 | | $WO_2$ & W | 3200 | 2400 | 19800 | 0.12 | 27.8 | 43.0 | 0.29 | 22.4 | 80 | 23 | 29 |
| Com. Ex. 4 | | None | 1300 | 1300 | 19800 | 0.07 | 27.8 | 102.8 | 0.33 | 7.8 | 210 | 120 | 28 |
| Com. Ex. 5 | | | 1300 | 1300 | 19800 | 0.07 | 27.8 | 102.8 | 0.33 | 7.8 | 210 | 120 | 40 |

Com. Ex. = Comparative Example
a = Dispersed particle size
b = Particle size in cured layer
c = Adhesion of cured layer
d = The number of peeled grids
e = Raw material powder
f = After dispersion

DESCRIPTION OF SIGNS AND NUMERALS

1 Thermal plasma
2 High-frequency plasma
3 Sheath gas feeding nozzle
4 Plasma gas feeding nozzle
5 Raw material powder feeding nozzle
6 Reaction vessel
7 Suction tube
8 Filter

The invention claimed is:

1. A near-infrared curable ink composition containing composite tungsten oxide fine particles as near-infrared absorbing fine particles and uncured thermosetting resin, wherein the composite tungsten oxide fine particles have a XRD peak top intensity ratio value of 0.13 or more based on a XRD peak intensity ratio value of 1 on plane (220) of a silicon powder standard sample 640c produced by NIST.

2. The near-infrared curable ink composition according to claim 1, wherein the composite tungsten oxide fine particles are expressed by general formula $M_xW_yO_z$ in which the M element is an element of one or more kinds selected from the group consisting of H, He, alkali metal, alkaline earth metal, rare earth elements, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, and I, the W is tungsten, the O is oxygen, and the x, the y and the z satisfy $0.001 \leq x/y \leq 1$ and $2.2 \leq z/y \leq 3.0$.

3. The near-infrared curable ink composition according to claim 2, wherein the M element is one or more selected from the group consisting of Cs, Rb, K, Tl, In, Ba, Li, Ca, Sr, Fe, and Sn.

4. The near-infrared curable ink composition according to claim 1, wherein some of the composite tungsten oxide fine particles have a hexagonal crystal structure or all have a hexagonal crystal structure.

5. The near-infrared curable ink composition according to claim 4, the composite tungsten oxide fine particles are a single crystal having an amorphous phase volume ratio of 50% or less.

6. The near-infrared curable ink composition according to claim 1, wherein a crystallite size of each composite tungsten oxide fine particle is 1 nm or more.

7. The near-infrared curable ink composition according to claim 1, wherein a surface of the near-infrared absorbing fine particles is coated with an oxide containing one or more elements of the group consisting of Si, Ti, Zr, and Al.

8. The near-infrared curable ink composition of according to claim 1, further containing one or more selected from the group consisting of organic pigments, inorganic pigments and dyes.

9. The near-infrared curable ink composition according to claim 1, further containing a dispersant.

10. The near-infrared curable ink composition according to claim 1, further containing a solvent.

11. The near-infrared curable ink composition according to claim 1, wherein a dispersed particle size of the near-infrared absorbing fine particles is 1 nm or more and 200 nm or less.

12. A near-infrared cured layer, wherein the near-infrared curable ink composition according to claim 1 is cured by being irradiated with near-infrared rays.

13. A method of stereolithography, comprising:
applying a near-infrared curable ink composition of claim 1 on a substrate to obtain a coated material; and
irradiating the coated material with near-infrared rays, to cure the near-infrared curable ink composition.

14. A method for producing a near-infrared curable ink composition containing composite tungsten oxide fine particles and an uncured thermosetting resin, the method comprising:
producing the composite tungsten oxide fine particles so as to have a XRD peak top intensity ratio value of 0.13 or more based on a XRD peak intensity ratio value of 1 on plane (220) of a silicon powder standard sample 640c produced by NIST; and
adding the produced composite tungsten oxide particles into the uncured thermosetting resin, while maintaining the XRD peak top intensity ratio value at 0.13 or more.

15. The near-infrared curable ink composition according to claim 1, the composite tungsten oxide fine particles are a single crystal having an amorphous phase volume ratio of 50% or less.

* * * * *